G. DEPNER.
FLY TRAP.
APPLICATION FILED JUNE 20, 1911.
1,007,931.
Patented Nov. 7, 1911.
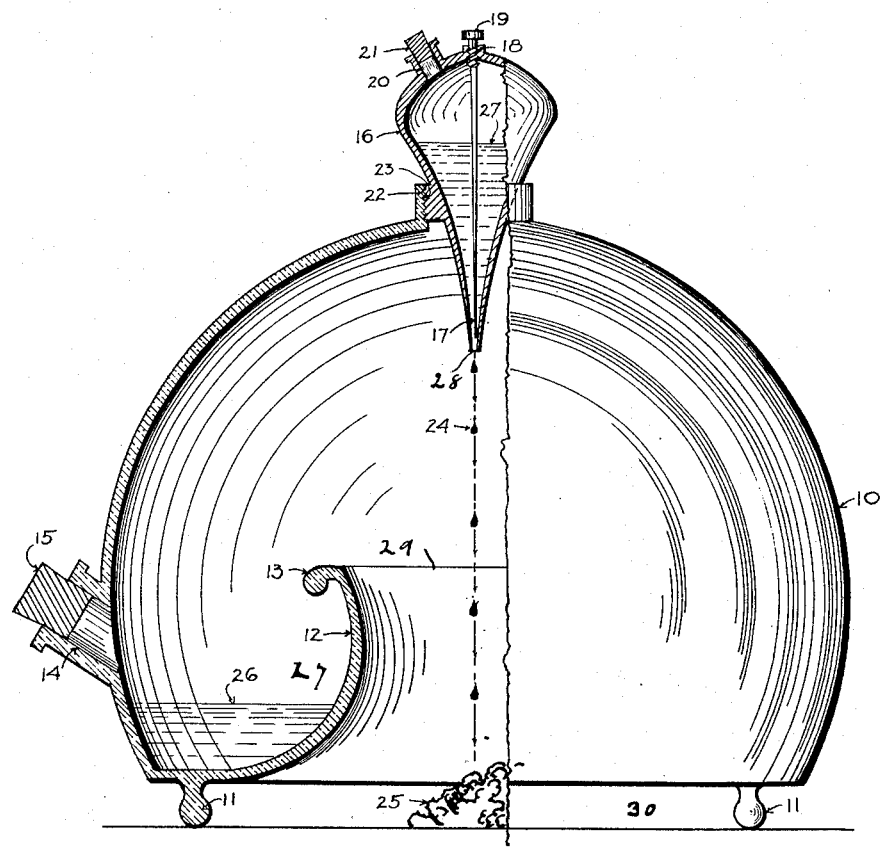

UNITED STATES PATENT OFFICE.

GOTTLIEB DEPNER, OF ROCKLYN, WASHINGTON, ASSIGNOR OF ONE-HALF TO GUSTAV DEPNER, OF ROCKLYN, WASHINGTON.

FLY-TRAP.

1,007,931. Specification of Letters Patent. Patented Nov. 7, 1911.

Application filed June 20, 1911. Serial No. 634,368.

*To all whom it may concern:*

Be it known that I, GOTTLIEB DEPNER, citizen of the United States of America, residing at Rocklyn, in the county of Lincoln and State of Washington, have invented certain new and useful Improvements in Fly-Traps, of which the following is a specification.

My invention relates to fly-traps and has for its object to provide an efficient trap of the character named and to add to the general construction of devices of that character, desirable improvements, which will be hereinafter described and claimed.

The single figure of the drawing accompanying this specification, is a combined broken-away side elevation and section of the complete device.

The trap comprises a dome-shaped transparent receptacle 10, preferably formed of glass. The receptacle is supported at a slight elevation by feet 11. The bottom of the receptacle is formed with a central opening 29 which is surrounded by an inturned annular flange 12. Said inturned flange forms the inner wall of an annular channel 27, adapted to receive a suitable liquid, preferably soap-water. At a short distance above the soap-water level 26 the flange 12 is formed with an annular ledge 13, which overhangs the channel 27. A filling nipple 14 provided with a suitable cork 15 leads through the wall of the receptacle 10 to a point above the water level 26 in the annular channel 27. The receptacle 10 is surmounted by a bowl 16 extending into the same through an opening encircled by an annular threaded flange 22. The threaded flange 22 is engaged by the annular threaded shoulder 23 of the bowl 16. The top of the bowl 16 is provided with a filling nipple 20, fitted with a suitable cork 21. A needle valve 17 provided with a handle 19 and a threaded portion 18 extends vertically through the bowl 16. By means of the handle 19 the valve 17 is elevated or lowered through the bowl 16 regulating the size of the opening 28 in the lower end thereof. A sweetened liquid 27 is filled into the bowl 16 and drops thereof 24 pass through the opening 28 and strike a piece of bread 25 or other spongy substance at the base of the receptacle 10 directly underneath the central opening 29. The continual dropping of the sweetened liquid 27 upon the bread 25 keeps a live and attractive bait for flies.

Flies will enter beneath the trap through the space 30 and be led to the sweetened substance 25 when they will be startled by the periodic drops 24 upon the same and will attempt to fly away. Flies generally fly upward and will be deceived by the transparent substance of the receptacle 10, will fly through the opening 29 into the dome of the receptacle 10, will gradually become exhausted in their efforts to escape and drop downward into the soap-water 26 where they will either drown or be killed by the soap-water. The annular ledge 13 prevents the flies from crawling out of the channel 27.

Having thus described my invention what I claim as new and useful and desire to secure by Letters-Patent, is—

1. The combination of a dome-shaped transparent receptacle having an opening in its bottom and a liquid-channel surrounding such opening, with a liquid bowl mounted at the top of the receptacle and opening into the same, such opening regulated by a needle valve to permit of periodic drops leaving the same and dropping downward through the opening in the receptacle to the base of the same.

2. In a fly-trap having a dome-shaped receptacle open at the bottom and supported at a slight elevation, a liquid bowl mounted at the top of the receptacle, provided with a filling nipple and a needle valve regulating the size of the opening from the bowl into the receptacle.

3. In a fly-trap having a dome-shaped receptacle open at the bottom, a liquid bowl mounted at the top of the receptacle provided with a filling nipple and opening into the receptacle together with means for regulating the falling of drops periodically from the bowl through the opening at the bottom of the receptacle.

In testimony whereof I affix my signature in presence of two witnesses.

GOTTLIEB DEPNER.

Witnesses:
WILLIAM H. KAYE,
GEO. E. SANFIELD.

Copies of this patent may be obtained for five cents each, by addressing the "Commissioner of Patents, Washington, D. C."